United States Patent Office

3,641,082
Patented Feb. 8, 1972

3,641,082
PROCESS FOR THE ALKYLATION, ALKENYLATION OR ARYLATION OF HEAVY-METAL SALTS BY MEANS OF ORGANO-TRIPTYCH-SILOXAZOLIDINES
Richard Müller, Radebeul, Hans Frey, Dresden, and Christian Dathe, Radebeul, Germany, assignors to Institut fur Silikon- und Fluorkarbon-Chemie, Radebeul, Germany
No Drawing. Filed Feb. 17, 1969, Ser. No. 799,959
Int. Cl. C07f 3/10, 72/24, 7/94
U.S. Cl. 260—431          13 Claims

ABSTRACT OF THE DISCLOSURE

Process for the alkylation, alkenylation or arylation of salts or hydroxides of heavy metals, such as mercury, bismuth, antimony and lead, comprising reacting them with organo-triptych-siloxazolidines in the presence of fluorine. The products according to this invention are useful as pharmaceuticals and pesticides, and may also serve in the synthesis of other useful products.

The present invention relates to a process for making alkyl-, alkenyl- and aryl compounds of heavy metals, with the exception of silver and copper. More particularly, the invention relates to the preparation of such compounds from compounds of heavy metals, such as mercury, bismuth, antimony and lead with the aid of organo-triptych-siloxazolidines, also called silatranes, especially by using 4,6,11,1,5-trioxazasila - 5 - organotricyclo-[3.3.3.0$^{1.5}$]-undecanes, having the formula shown below:

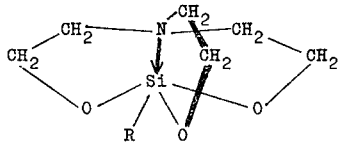

Previous experimental work has proved that organo-triptych-siloxazolidines reacted with silver salts in aqueous solutions in the presence of fluorine ions will yield metallic silver after having passed through an intermediate stage, the product of which could not be isolated.

With copper, similar results were obtained, no intermediate product being isolated.

It was now found that, surprisingly, no reduction to the metallic stage will take place e.g. with metal compounds of bismuth or lead, or other heavy-metal salts and that consequently the organo-triptych-siloxazolidines could be used for the preparation of metal-organic compounds in aqueous solutions.

The organo-triptych-siloxazolidines can easily be prepared by reaction, for instance, of an organotrialkoxysilane with triethanolamine according to the following equation:

$RSi(OR')_3 + N(CH_2CH_2OH)_3 \longrightarrow$

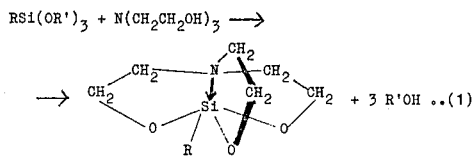  $+ 3 R'OH$ ..(1)

wherein R stands for $CH_3$, $C_2H_5$, $C_6H_5$ and the like, R' for $CH_3$, $C_2H_5$, $CH_3CO$ and the like. In addition to being made with $N(CH_2CH_2OH)_3$, triptych compounds may also be prepared, for instance, by reaction with $N(C_6H_4OH)_3$.

The silicon present in the organo-triptych-siloxazolidines is, according to X-ray findings, pentavalent (Chem. Eng. News. 45, 1967, No. 42, p. 46).

A number of methods are known to prepare the organo-triptych-siloxazolidines of which, by way of example, U.S. Pat. 2,953,545 of Sept. 20, 1960 to A. B. Finestone, assigned to Westinghouse Electric Corp., and U.S. Pat. 3,118,921 of Jan. 21, 1964 to C. M. Samour, assigned to The Kendall Co. are mentioned.

As stated above, the present invention deals with the reaction of compounds of heavy metals, such as mercury, bismuth, antimony and lead, more particularly $HgCl_2$, $Bi(OH)_3$, $SbF_4$ and $Pb(CH_3COO)_4$ with organo-triptychsiloxazolidines which may be thus converted into organometal compounds in a simple manner. Mercuro compounds may likewise be reacted, yielding organomercury compounds according to the following equation:

$RSi(OCH_2CH_2)_3N + Hg_2F_2 + 2NH_4F + 4HF$ $\rightarrow RHgF + Hg + (NH_4)_2SiF_6$ $+ (HOCH_2CH_2)_3N \cdot HF$  (2)

However, part of the $Hg^+$ ions is reduced to mercury in this reaction by disproportioning, a phenomenon which does not occur when mercuri compounds are reacted (see Equation 3 somewhat later in the description).

The reaction can be carried out in aqueous solution. For increasing the solubility, particularly of the aryl-triptychsiloxazolidines in aqueous metal salts, a solubilizing agent, such as alcohol or ketones, may be added.

When the heavy-metal salts are present as fluorides in the reaction mixture, further additions are not necessary, since the fluorides will be dissociated with formation of F-ions. However, when the heavy metals are used in the form of their chlorides, nitrates, sulfates, acetates, hydroxides or oxides, it is necessary to add a fluorine-supplying fluoride. This may be ammonium fluoride, hydrofluoric acid or another fluoride easily soluble in the reaction mixture.

The process according to the invention can be carried out with any one of the readily available alkyl-, alkenyl- or aryl-triptych-siloxazolidines. Since it is advantageous for the reaction to add an acid, e.g. hydrofluoric acid, in order to compensate for the alkaline action of the triethanolamines formed as a by-product, it is to be considered a fortunate property of the organo-triptych-siloxazolidines that they are stable in acidic solutions for a longer time than the organopentafluorosilicates.

It is another advantage of the process according to the invention that reaction will set in most of the time by simple mixture of the dissolved reaction partners and will lead to almost quantitative results without particular after-treatment. When mercury-II-salt solution is simply added to ammoniumfluoride-containing organo-triptych-siloxazolidines solution the respective organomercury salt will be obtained in high yield. The reaction is illustrated below:

$RSi(OCH_2CH_2)_3N + HgCl_2 + 3NH_4F + 4HF \rightarrow RHgCl +$ $(NH_4)_2SiF_6 + (HOCH_2CH_2)_3N \cdot HF + NH_4Cl$  (3)

When a lead salt is reacted in an analogous manner, the reaction results in diorganoleaddifluoride in good yield, with some triorganoleaddifluoride being formed at the same time.

In the use of antimonytrifluoride, the result will be mainly the formation of diorganoantimonyfluoride with a minor quantity of triorganoantimony. Bismuth salts or hydroxide, however, will lead from the beginning to very clean triorganobismuth compounds.

The products obtained in accordance with the invention are useful as pharmaceuticals, pesticides and may also serve in the synthesis of other useful products.

In the following, a number of examples are given for the purpose of illustrating the invention but it should be understood that many changes in the details can be

EXAMPLE 1

47.25 g. (0.25 mol) methyl-triptych-siloxazolidine were charged into a flask together with 400 ml. acetone and 190 ml. water; to this was added, drop by drop, and with stirring, a solution of 67.9 g. (0.25 mol) mercury-II-chloride, 23.6 g. ammonium fluoride, and 32 g. ammonium chloride in 210 ml. water, the ammonium chloride serving for enhancing the solubility of $HgCl_2$. A white precipitate forms after a short time at room temperature. After 5 hours, acetone is removed by slight heating and a water-jet vacuum pump, the precipitate crystal mash remaining as residue. Impurities are extracted with alcohol, and obtained were 35 g. methylmercurychloride (57% of the theoretical value); melting point 167 to 168° C. (literature mentions 167° C.).

EXAMPLE 2

50 g. vinyl-triptych-siloxazolidine were dissolved in 280 ml. water and 400 ml. ethanol. Into this solution, a mixture of 67.9 g. mercury-II-chloride, 23.6 g. ammonium fluoride and 31.8 g. ammonium chloride in 200 ml. water was slowly introduced and mixed vigorously for about 2 hours. For completing formation of the white precipitate, the mass is finally heated to 50° C. and after having stood for some time, alcohol is removed in vacuo. The crystal mash obtained is separated by filtration with suction. By rinsing with ethanol, 60 g. vinylmercurychloride are obtained (89% of the theoretical value); melting point 176° C.; literature: 177° C.

EXAMPLE 3

62.75 g. phenyl-triptych-siloxazolidine are dissolved in 400 ml. ethylalcohol and 290 ml. water. Into the solution, we add drop by drop a solution of 67.9 mercury-II-chloride, 23.6 g. ammonium fluoride and 32.6 g. ammonium chloride in 210 ml. water at room temperature. After about 3 hours, the reaction mixture is heated to 50 to 60° C. and the solvent ethanol removed thereafter. The crystal mash formed contains 60 g. phenylmercurychloride (83% of the theoretical value) of a melting point of 269 to 270° C.; literature 271° C.

When mercury-II-nitrate is used, the corresponding phenylmercurynitrate is formed in a yield of 60 to 70%, boiling point 177° C.; literature 176 to 186° C.

EXAMPLE 4

In a plantinum crucible 50 g. 40% hydrofluoric acid are poured over 26 g. (0.1 mol) bismuth hydroxide and the mass is heated to about 40° C.; then 200 ml. saturated ammonium fluoride solution are added. 75 g. (0.3 mol) phenyl-triptych-siloxazolidine are added slowly to the mixture while stirring and slightly heating. The reaction product formed, which at first floats on the surface as a mash, becomes solid and brittle upon cooling. The mass is filtered, the residue rinsed with water and dried. Extraction with ether gave 19 g. of a white crystalline substance consisting of insolubles (yield 44% of the theoretical). This was recrystallized with ethanol whereby pure bismuthtriphenyl was obtained having a boiling point of 78° C.; literature 78° C.

*Analysis.* — Calc. (percent): C, 49.09; H, 3.43; Bi, 47.48. Found (percent): C, 49.05; H, 3.49; Bi, 47.48.

EXAMPLE 5

18 g. (0.1 mol) antimony fluoride were introduced into 250 g. saturated ammonium fluoride solution and 50 g. 40% hydrofluoric acid. Into the solution we charge gradually 75 g. (0.3 mol) phenyl-triptych-siloxazolidine with vigorous stirring and slight heating. A brownish, very viscous product is thereby formed, which solidifies upon cooling. Heating above 70° C. has to be avoided since it would lead to splitting off of benzene. The solidified product is separated, washed with water, and dried. For the purpose of purification, it is comminuted and freed of small amounts of simultaneously formed triphenylantimony by washing with ether; the melting point of triphenylantimony is 47° C.; literature 46 to 48° C. The insoluble portion can be dissolved in hot ethanol, from which upon cooling colorless diphenylantimonyfluoride crystallizes; yield 45% of the theoretical.

*Analysis.*—Calc. (percent): C, 48.86; H, 3.42; F, 6.44. Found (percent): C, 48.36; H, 4.04; F, 6.36.

EXAMPLE 6

45 g. (0.1 mol) lead-IV-acetate were charged into 300 ml. of saturated, aqueous ammonium fluoride solution and thereto 76.0 g. (0.4 mol) methyl-triptych-siloxazolidine were added immediately in small portions, at room temperature, while stirring. When the reaction mixture becomes brighter and a brown discoloration, which occurs at first due to $PbO_2$ formation, has vanished, stirring is continued for one hour and heating to 70° C. is carried out. Then the mass is cooled and an amorphous white precipitate is separated. Washing with ethanol yields 24.5 g. dimethylleaddifluoride (90% of the theory).

*Analysis.*—Calcd. (percent): C, 8.73; H, 2.8; Pb, 75.3. Found (percent): C, 8.88; H, 2.65; Pb, 74.8.

EXAMPLE 7

22.5 g. (0.05 mol) lead-IV-acetate is added into 250 ml. of a saturated solution of ammonium fluoride at room temperature, while stirring. Immediately thereafter, 50 g. (0.2 mol) vinyl-triptych-siloxazolidine is introduced into the reaction mixture in portions, while cooling the reaction vessel from time to time with cold water. After brightening of the mixture (see above in Example 6), stirring is continued for another 2 to 3 hours and the mixture is allowed to stand overnight. The precipitated product is then separated, which yields after washing with ethanol and drying, 13 g. of a crude product consisting of 7.6 g. divinylleaddifluoride (51% of the theory) and 5.4 g. trivinylleadfluoride.

*Analysis of the divinylleaddifluoride.*—Calc. (percent): C, 16.05; H, 2.02; F, 12.7. Found (percent): C, 15.50; H, 2.15; F, 13.03.

*Analysis of the trivinylleadfluoride.*—Calc. (percent): C, 23.44; H, 2.93; F, 6.18. Found (percent): C, 25.21, H, 2.80; F, 7.61.

An addition of 20 g. 40% hydrofluoric acid to the reaction mixture leads to a pure white product, but in that case a slight splitting off of the vinyl group easily takes place.

EXAMPLE 8

45 g. (0.1 mol) lead-IV-acetate are added to 300 ml. ammonium fluoride solution and immediately thereafter 100 g. (0.4 mol) phenyl-triptych-siloxazolidine are added in portions at room temperature, while stirring. After the addition is completed and the coffee-colored discoloration has vanished, an amorphous white precipitate is formed which is separated after it has been shortly heated to 60° C. and allowed to stand overnight. By washing with methanol, 34 g. diphenylleaddifluoride were obtained (85% of the theory).

*Analysis.*—Calc. (percent): C, 36.09; H, 2.52; Pb, 51.88. Found (percent): C, 35.70; H, 2.56; Pb, 52.29.

After concentration of the methanol extract cotton-like, needle-shaped crystals are formed consisting of triphenylleadfluoride.

*Analysis.*—Calc. (percent): C, 47.26; H, 3.30; F, 4.15. Found (percent): C, 43.63; H, 3.35; F, 4.85.

An addition of 40 g. 40% hydrofluoric acid to the reaction mixture prevented brown discoloration by the formation of lead dioxide and leads to a white product.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What we claim is:

1. A process for the alkylation, alkenylation or arylation of salts or hydroxides of heavy metals selected from the group consisting of mercury, bismuth, antimony and lead, comprising reacting them with alkyl-, alkenyl- or aryl-triptych-siloxazolidines in the presence of fluorine.

2. The process as defined in claim 1, wherein said salts of the heavy metals are reacted in aqueous solution.

3. The process as defined in claim 2, wherein said salts are selected from the group consisting of fluorides, chlorides, nitrates, sulfates and acetates.

4. The process as defined in claim 2, wherein the reaction is carried out with addition of a compound supplying fluorine-ions in solution.

5. The process as defined in claim 2, wherein the reacted salt is a mercury salt.

6. The process as defined in claim 2, wherein the reacted salt is an antimony salt.

7. The process as defined in claim 2, wherein the reacted salt is a lead salt.

8. The process as defined in claim 1, wherein the reacted hydroxide is bismuth hydroxide.

9. The process as defined in claim 1, wherein the reaction is carried out with methyl-triptych-siloxazolidine.

10. The process as defined in claim 1, wherein said reaction is carried out with phenyl-triptych-siloxazolidine.

11. The process as defined in claim 1, wherein said reaction is carried out with vinyl-triptych-siloxazolidine.

12. The process as defined in claim 1, wherein the reaction is carried out with addition of a solubility enhancing agent.

13. The process as defined in claim 12, wherein said agent is an alcohol or a ketone.

References Cited
UNITED STATES PATENTS

| | | | |
|---|---|---|---|
| 3,401,186 | 9/1968 | Müller et al. | 260—431 X |
| 3,458,551 | 7/1969 | Müller et al. | 260—440 |
| 3,465,012 | 9/1969 | Müller et al. | 260—437 |

TOBIAS E. LEVOW, Primary Examiner

H. M. S. SNEED, Assistant Examiner

U.S. Cl. X.R.

260—429, 429.7, 429.9, 433, 437, 440, 446, 447